March 13, 1934. T. M. DE LA GARDE 1,950,660
FOCUSING DEVICE FOR CAMERAS
Original Filed Jan. 29, 1932
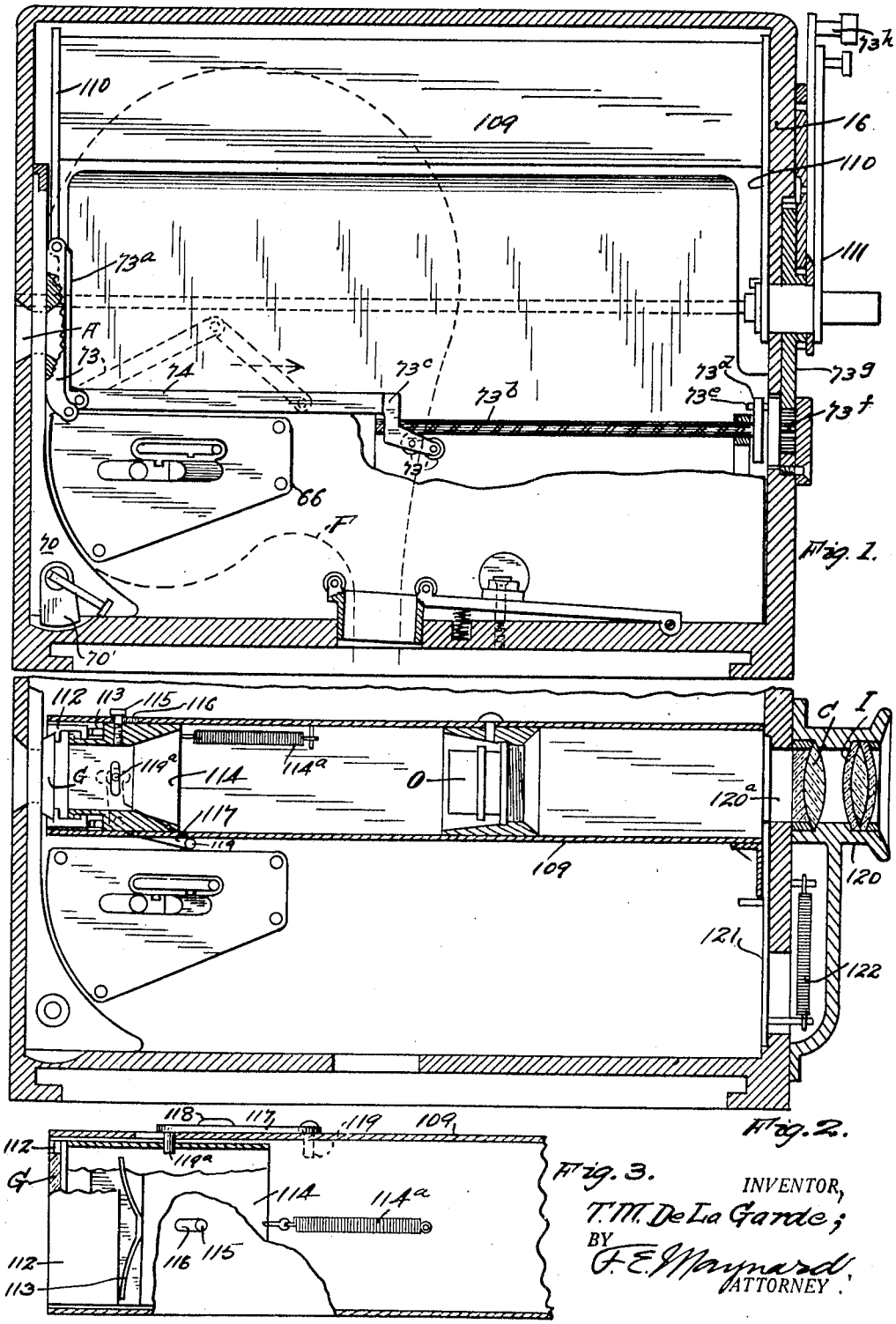

Patented Mar. 13, 1934

1,950,660

UNITED STATES PATENT OFFICE 1,950,660

FOCUSING DEVICE FOR CAMERAS

Theodor M. De La Garde, Los Angeles, Calif., assignor of three-fourths to Thomas L. Tally, Beverly Hills, Calif.

Original application January 29, 1932, Serial No. 589,683. Divided and this application May 20, 1932, Serial No. 612,536

5 Claims. (Cl. 88—16)

This invention relates to cameras and especially to motion-picture cameras of the type disclosed in application Ser. No. 557,840, filed August 18, 1931, to which reference is made for general and detail description of the camera and of which this application is, in part, a continuation, and this application is a division of co-pending application Ser. No. 589,683, filed January 29, 1932.

It is an object of the present invention to provide several refinements in details of construction and combination of elements in the camera, as will be more particularly disclosed herebelow.

More particularly, an object is to provide an especially efficient means for focusing or viewing the image in the photographic lens of the camera, and in this connection it is an object to provide means for deflecting the extended loop of film passing from the magazine into the photographic chamber of the camera case whence it is intermittently advanced by a film feeding "movement".

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a vertical, longitudinal section of the camera housing and shows the film movement shell disposed therein opposite to the camera aperture plate and illustrates the focusing device in raised, unobstructing position and illustrates a retractive pressure plate frame in effective position at the aperture plate and combined with means for retracting the plate to remove it from the path of the focusing device and to deflect the film loop in the camera chamber clear of the focusing device; and also showing the magazine lock in releasing position.

Figure 2 is a horizontal sectional view of the camera housing showing the focusing device as shifted into alignment with the focusing axis of the camera aperture.

Figure 3 is a plan and partial longitudinal section of the front end of the focusing device and showing a ground glass therein retracted.

The film F leads to and under a movement shell 66 whose front face is concentric with and slightly spaced from a film race block 70 which can be pressed into place at the camera aperture A and locked by a key 70'. At the aperture is hinged a tilting frame 73 in whose upper end is pivoted a presser and guide plate 73ª whose lower end is pivoted on a draw bar 74 slidable longitudinally in the box by means of a fast-pitch screw 73$^b$ engaging a nut 73$^c$ on the draw-bar. The screw 73$^b$ is slip-coupled by a crank disc 73$^d$ to a crank-pin 73$^e$ on a small gear 73$^f$ operated by a gear train 73$^g$ powered by a hand crank 73$^h$ mounted on the outside of the camera box 16, for a purpose later explained.

Means are provided whereby to make direct view focus through the camera box on the lens axis and for that reason the guide gate 73 is tiltable back and away from the aperture A, by means above described. Then a focusing tube 109 having end arms 110 pivoted on an axis to one side of the lens axis is swung down laterally by means of a crank handle 111, which is on an axis concentric with the gate retracting crank 73$^h$.

To fully retract the film loop out of the way of the focus tube the loop is roved between a pair of guide rollers 73$^i$ on the inner end of the draw-bar 74 and the frame 73 and gate 73$^a$ pulled out quite flat by the bar 74.

A feature of this invention resides in the focusing device, the tube of which is provided, at one end, with a ground glass frame 112 having a ground glass G and pressed outward by a set of springs 113 set in a carriage 114 telescoping in the tube and normally retracted by a spring 114$^a$ to a limit determined by a stop pin 115 playing in a slot 116 in the tube 109. When the tube is swung down to lens axis of aperture A, a lever 117, pivoted at 118 on one side of the tube and having a tappet lug 119, to strike on the shell 66, is then rocked and causes a plin 119$^a$, on the lever, to press the carriage 114 outward and force the ground glass out flat against the focal plane of the film in the race at the aperture. As the ground glass comes to the focal plane it stops on the race and the springs 113 compensate for further stroke of the carriage by lever 117. All this action is accomplished by movement of the focusing handle 111, and follows the retraction of the film loop and the guide gate.

When focusing is completed, the handle 111 is thrown back and lifts the tube from the lens axis and the spring 114$^a$ retracts the carriage 114 and the ground glass and thus protects the film and race from scratching.

In the tube is an anastigmatic, objective lens O which is preferably of a 2" focal length, corrected combination, (hypar, tessar, tachar, protar or the like), reversing the inverted image. The image from lens O is then taken up by a corrected field lens C mounted in an eye piece 120 on the back of the camera and in line with an achromatic eye-piece lens I showing an enlarged, upright image of the ground glass picture.

The wall of the box to which the eye-piece 120 is attached has a light hole 120ª on the camera lens axis and when the focusing tube is shifted to focusing position, it engages an eye-piece hole shutter 121 and presses this out of shutting position against the closing effort of a spring 122. As the tube is moved from focusing position, the spring automatically closes the shutter 121 to prevent light entry to the film loop box.

What is claimed is:

1. In a camera, a film presser and guide gate, a hinged frame on the swinging end of which said gate is hinged on an axis parallel to the frame axis, means for drawing the frame and gate in unfolded position out of the lens axis of the camera; said means including a shiftable element to which the gate is connected, and a fast pitch screw operatively connected to said element for shifting it.

2. In a camera, a film presser and guide gate, a hinged frame on the swinging end of which said gate is hinged on an axis parallel to the frame axis, and means for drawing the frame and gate in unfolded position out of the lens axis of the camera; said means including a device to receive a part of a film strip and operative to carry the said part of the film out of the lens axis.

3. In a motion picture film camera, a focusing device within the camera chamber having means for viewing from rear to front directly along the lens axis of the camera, said focusing device being mounted for movement to and from the lens axis, a stationary race at the exposure aperture of the chamber and means adapted to engage a film loop part coming from the race and operative in a direction toward the end of said chamber opposite to the aperture part to elongate the loop from the race along and below the lens axis to provide clearance for the said device.

4. In a motion picture film camera, a film loop chamber having an interior focusing device providing for viewing from the rear end of the camera directly along the lens axis, an exposure aperture on the lens axis, means at the aperture to guide a part of a film bight, and a device adapted to engage a part of the film bight and movable only in a path on a plane which is normal to the aperture so that the film loop is elongated in a direction along and below the lens axis without lateral movement of the film.

5. In a motion picture camera, an exposure aperture part and a race way arranged at said part, a device adapted to engage a portion of a film loop issuing from the race way, and means to move said device and its engaged film in a direction away from the race way and normal to the exposure aperture and elongate the film loop along and below the camera lens axis.

THEODOR M. DE LA GARDE.